(No Model.)

W. M. FITZWATER.
ADDING MACHINE.

No. 432,393. Patented July 15, 1890.

Witnesses.
Wm. S. Hodges
Geo. O. Bollinger

Inventor.
Wm M. Fitzwater
By Patrick O'Farrell,
Attorney

UNITED STATES PATENT OFFICE.

WILLIAM M. FITZWATER, OF WHITE FORGE, VIRGINIA.

ADDING-MACHINE.

SPECIFICATION forming part of Letters Patent No. 432,393, dated July 15, 1890.

Application filed March 4, 1890. Serial No. 342,534. (No model.)

*To all whom it may concern:*

Be it known that I, WILLIAM M. FITZWATER, a citizen of the United States of America, residing at White Forge, in the county of Scott and State of Virginia, have invented certain new and useful Improvements in Adding-Machines, of which the following is a specification, reference being had therein to the accompanying drawings.

This invention pertains to certain new and useful improvements in adding-machines, having for its object the production of simple and highly-efficient means for readily and accurately adding a series of numbers.

The invention comprises a series of disks representing numbers of different value, each disk being divided off into a series of numbers represented by different-colored spaces to aid in the calculation or addition; and it also comprises the detail construction, combination, and arrangement of parts, substantially as hereinafter fully set forth, and particularly pointed out in the claims.

Figure 1:
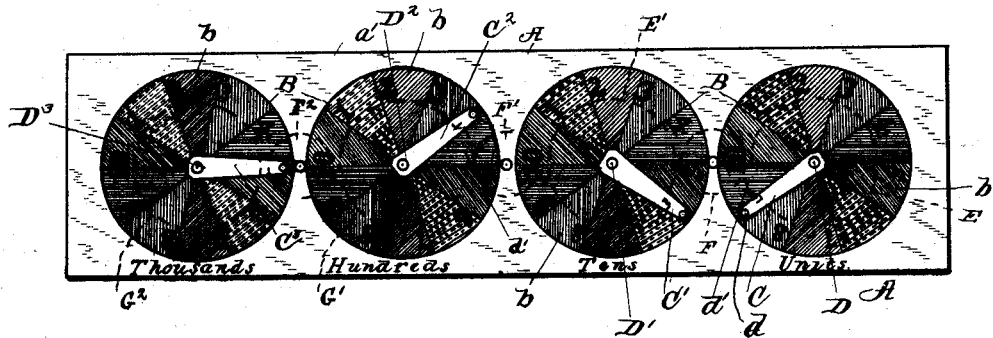
Figure 2:
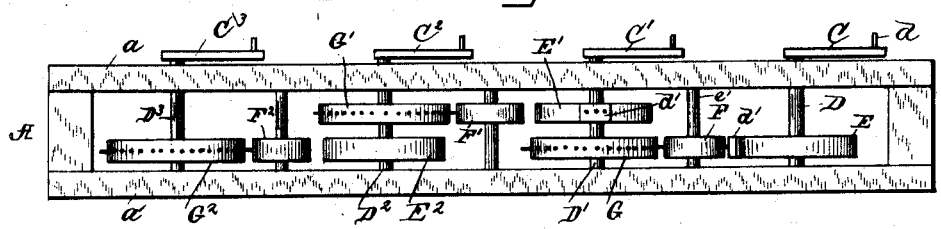
Figure 3:
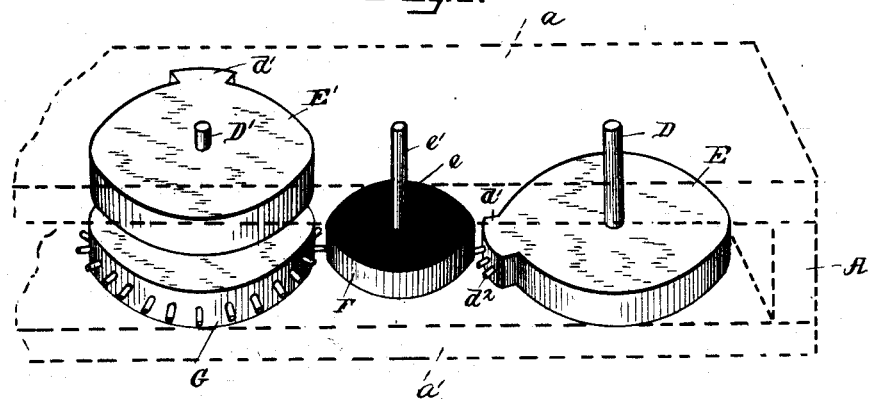

In the accompanying drawings, Figure 1 is a plan view of my improved adding-machine with parts in dotted lines. Fig. 2 is a front elevation. Fig. 3 is a detail view of the operating mechanism.

Referring to the drawings, A designates a frame, of any preferred form of construction, preferably provided with parallel top and bottom pieces $a$ $a'$.

B designates a series of disks or dials formed on or secured to the upper surface of top piece $a$. Each disk or dial is divided off into separate spaces $b$, numbered, respectively, from one (1) to ten (10.) To aid in the rapidity of calculation, each half of each disk has its spaces $b$ of different colors—such as red, white, blue, yellow, and green—which are repeated in the order named on the other half of the disk. This is an important feature, since it greatly aids the operator in calculating or adding.

C is a pointer moving over the end or unit disk B and provided with a short handle $d$ for turning. This pointer is rigidly secured on the upper end of a shaft D, supported by frame A. Upon this shaft is secured a wheel E, having a segment of its periphery extended or formed into a lug $d'$, provided with teeth $d^2$.

F is a small intermediate rubber wheel secured fast upon a shaft $e'$, also supported by frame A, or said wheel may be of any material and provided with a rubber tire. This wheel is given a limited movement by lug $d'$, whose teeth $d^2$ engage therewith as pointer C passes from nine (9) to ten (10) on the disk or dial. Motion is imparted to pointer C' of the second disk or dial through the movement of wheel F, which is continuously in contact with the toothed periphery of a wheel G, fast upon shaft D', which is also provided with a wheel E', similar to wheel E. This wheel E' has a toothed lug $d'$, which engages a second intermediate wheel F', which is continuously in contact with the toothed periphery of a wheel G' on shaft D², to which pointer C² is secured. A wheel E², provided with a toothed lug similar to lug $d'$ of wheel E, is secured fast upon shaft D², and through the agency of the intermediate wheel F² imparts motion to wheel G² of shaft G³, carrying pointer C³. In this manner motion may be transmitted to any number of wheels or pointers.

It will be understood that the pointer of each successive disk or dial is only moved one point as the pointer of the next lower disk or dial has been moved ten points or made one complete revolution.

As constructed, my adding-machine is composed of parts extremely simple in construction and arrangement, and which permit of ready and easy manipulation.

By making the intermediate wheels of rubber the complete device is rendered much lighter in weight, and these wheels will not be injured by constant use, and the contact of the teeth is always rendered certain.

I claim as my invention—

1. In an adding-machine, the combination, with the disks or dials, and the series of wheels having teeth and the wheels having toothed lugs, of the intermediate wheels of rubber, with which engage the teeth of said wheels and lugs, as and for the purpose set forth.

2. The herein-described improved adding-machine, consisting of the frame having on its upper surface a series of disks or dials, the series of shafts secured in said frame and carrying pointers at their upper ends projected over said disks or dials, the wheels, as E, fast on such shafts having toothed lugs, the toothed wheels, as G, also fast on said shafts, the intermediate rubber wheels, as F, together with their shafts, between each series of shafts and wheels, and with which engage the teeth of the wheels, as G, and the toothed lugs, all constructed and arranged substantially as set forth.

In testimony whereof I affix my signature in presence of two witnesses.

WILLIAM M. FITZWATER.

Witnesses:
J. NOTA McGILL,
GEO. C. BOLLINGER.